United States Patent
Kimura

(10) Patent No.: US 7,527,679 B2
(45) Date of Patent: May 5, 2009

(54) POLLUTING GAS DESULFURIZATION APPARATUS

(75) Inventor: Takeshi Kimura, 742-9, Yoshizawa-cho, Mito-shi, Ibaraki (JP)

(73) Assignees: Takeshi Kimura, Ibaraki (JP); Noriko Kimura, Tokyo (JP); Junko Sato, Ibaraki (JP); Shigeru Kimura, Tokyo (JP)

( * ) Notice: Subject to any disclaimer, the term of this patent is extended or adjusted under 35 U.S.C. 154(b) by 225 days.

(21) Appl. No.: 11/783,573

(22) Filed: Apr. 10, 2007

(65) Prior Publication Data

US 2008/0008630 A1   Jan. 10, 2008

(30) Foreign Application Priority Data

Jul. 4, 2006   (JP) .............................. 2006-184261

(51) Int. Cl.
   *B01D 47/18*   (2006.01)
(52) U.S. Cl. .............................. 96/286; 95/235; 96/291; 261/90
(58) Field of Classification Search ........... 96/281–291; 95/210–213, 235; 261/90, 92; 422/224, 422/225

See application file for complete search history.

(56) References Cited

U.S. PATENT DOCUMENTS

| | | | | |
|---|---|---|---|---|
| 879,219 A * | 2/1908 | Towns | ........................ | 96/282 |
| 1,717,412 A * | 6/1929 | Rowe | ........................ | 96/249 |
| 1,948,791 A * | 2/1934 | Halstead | ........................ | 261/8 |
| 1,984,871 A * | 12/1934 | Fedeler | ........................ | 96/286 |
| 2,698,745 A * | 1/1955 | Boucher | ........................ | 261/90 |
| 3,385,573 A * | 5/1968 | Gilman | ........................ | 261/24 |
| 3,479,801 A * | 11/1969 | Yamasaki | ........................ | 96/229 |
| 3,712,031 A * | 1/1973 | Santa Cruz | ........................ | 96/265 |
| 3,880,623 A * | 4/1975 | Aoyama | ........................ | 96/283 |
| 4,135,894 A * | 1/1979 | Himes et al. | ........................ | 95/215 |
| 4,941,898 A * | 7/1990 | Kimura | ........................ | 96/282 |
| 5,681,371 A * | 10/1997 | Carr | ........................ | 95/204 |
| 5,704,954 A * | 1/1998 | Takagi | ........................ | 96/286 |
| 5,851,271 A * | 12/1998 | Baptista et al. | ........................ | 96/286 |
| 6,939,398 B2 * | 9/2005 | Gorbulsky | ........................ | 96/234 |
| 2004/0079234 A1 * | 4/2004 | Gorbulsky | ........................ | 96/289 |

FOREIGN PATENT DOCUMENTS

| GB | 2169816 A * | 7/1986 | ................... 96/282 |
|---|---|---|---|
| JP | 53-19171 | 5/1978 | |

\* cited by examiner

*Primary Examiner*—Richard L Chiesa
(74) *Attorney, Agent, or Firm*—Wenderoth, Lind & Ponack, L.L.P.

(57) ABSTRACT

A compact and energy-efficient polluting gas desulfurization apparatus which reduces gas flow pressure loss and the consumption of electrical power. A drum is rotationally supported at its radial center by a horizontal shaft within a fixed duct having a gas inlet port at one end and a gas outlet port at the other end. The right and left sides of the drum and its circumferential surface are lattice-like structures, and the internal space of the drum is filled with gas-liquid contact filler pieces. A slurry holding tank is disposed beneath the rotating drum. Slurry, which is pumped upward by a circulation system, is discharged onto the top of the circumferential surface of the drum at a point offset from the horizontal shaft along the radial axis, thus forming a mechanism able to rotate the drum from the weight of the slurry only and thus eliminating the need for an electric motor.

1 Claim, 5 Drawing Sheets

POLLUTING GAS DESULFURIZATION APPARATUS

TECHNICAL FIELD

The invention relates to an environment-cleansing desulfurization apparatus which significantly reduces gas flow pressure loss as well as the consumption of electrical power of a polluting gas washing process, more specifically, a sulfur dioxide gas washing process employed to wash the smoke and particulate exhaust matter discharged from factories, electrical generating plants, waste incineration plants and other like facilities.

BACKGROUND OF THE INVENTION

The inventor has previously invented an apparatus, which is known in the art and described in Japanese Utility Patent No. 53-19171), to remove the polluting component of sulfur from the exhaust smoke emitted by the combustion processes used by factories, electrical power generating plants and other like facilities.

The aforesaid apparatus includes a rotatable drum comprising a round end plate attached to one end through which a gas to be treated enters, a round end plate attached to the other end through which said gas exits, and U-shaped channels formed by multiple lifter parts arranged in parallel in the axial direction on the internal side of the drum wall connecting the two round end plates, said channels providing means of carrying a desulfurization agent upward within the rotatable drum. The drum, which rotates around a horizontal axis, is filled with multiple separate filler pieces, each incorporating holes and/or slots, A desulfurizing slurry supply means is installed at one end of the rotatable drum, and a slurry discharge means is installed at the other end. The rotation of the drum results in the filler pieces at the bottom of the rotating drum being soaked in the desulphurizing slurry holding part of the drum, thereby allowing the slurry to be brought into contact with the gas to be treated in both parallel and cross-flow directions.

[Reference Document 1] Japanese Utility Patent 53-19171

DISCLOSURE OF THE INVENTION

[Shortcomings in the Prior Art Resolved by the Invention]

Because the exhaust smoke desulfurization apparatus described by the Reference Document 1 includes a gas intake port on one end plate of the rotating drum, a gas exhaust port on the other end plate of the rotating drum, and a slurry holding part at the bottom of the rotating drum, the path through which the gas to be treated flows is extremely narrow, thus resulting in a significant loss in gas flow pressure which adversely affects the efficiency of the desulfurization process.

Moreover, the overall size of the exhaust smoke desulfurization apparatus described in the Reference Document 1 is quite large due to the power required to rotate the drum and carry the slurry upward, and the need to use a relatively large mechanism to rotate the drum. These are factors which raise operating costs due to increased electrical power consumption and maintenance demands.

[Means of Resolving Shortcomings in the Prior Art]

The invention described in this specification is a compact smoke desulfurization apparatus which eliminates the above-noted shortcomings through an efficient desulfurization process offering the advantages of economical operation, a reduction in gas flow pressure loss, an effective descaling action, and reduced maintenance. The invention comprises a rotatable drum having lateral and circumferential surfaces of a perforated lattice structure rotatably supported at its axial center, within a fixed duct of specific length, by a horizontal shaft extending from a gas inlet port side to a gas exhaust port side of said fixed duct;

a rotatable filler thickness formed of gas-liquid contact filler pieces residing within the aforesaid drum;

a slurry holding tank incorporating a gas sealing plate installed at the gas inlet and gas outlet side of the rotatable filler thickness as means of axially directing a flow of gas through the filler thickness, a supply pipe which supplies a slurry containing an absorption agent, and a discharge pipe which exhausts a product material within the slurry, said supply pipe and discharge pipe being installed beneath the filler thickness, and a recirculation means incorporating a pump which pumps the slurry upward from the slurry holding tank onto the upper part of the circumferential surface of the drum, at a point offset from the horizontal shaft along the radial axis, in order to apply a greater weight volume of slurry to one side of the drum, thus inducing a weight imbalance of slurry within the drum which has the effect of rotating the filler thickness and further propagating gas-liquid contact.

The present invention eliminates the need for a large mechanical drive system to rotate the filler thickness due to the drum being rotated by the weight of the polluting gas-absorbing slurry which is supplied to the top of the drum and recirculated, thus eliminating the need for a separate power source and significantly reducing the electrical power required by the apparatus.

Moreover, the filler pieces contained within the drum provide an effective scaling prevention effect through the action in which the filler pieces bump and scrape against each other during drum rotation. In addition, the inclusion of a separate freely moving internal filler element within each filler piece results in the filler piece and internal filler element striking each other, thus providing an improved anti-scaling effect.

DETAILED DESCRIPTION OF THE INVENTION

The following will describe an embodiment of the invention with reference to the drawings. FIG. 1 is a vertical cross sectional view of an embodiment of the polluting gas desulfurization apparatus wherein the cross section has been taken through the axial center of the rotating drum. This embodiment includes a fixed duct 1, a basket-shaped rotating drum 8 (hereafter referred to as "drum 8"), gas-liquid contact filler pieces 9 installed within the drum 8, a slurry holding tank 10 (hereafter referred to as "holding tank 10") disposed beneath the drum 8, and a circulation means 13 which circulates the slurry from the holding tank 10 onto one side of the upper circumference of the drum 8.

The fixed duct 1 is of a specific length, disposed horizontally, and includes a gas inlet port 2 at one extremity and gas exhaust port 3 at the opposing extremity. The drum 8 is installed within the fixed duct 1 in a space which widens in forward and rearward directions as it extends upwards. The circumferential surface of the drum 8 is formed as a lattice structure incorporating orifices 90 mm to 100 mm in size in order that the filler pieces 9, each having a diameter of approximately 110 mm and a length of approximately 110 mm, may be held therein.

The drum 8 is rotatably supported within the fixed duct 1 on a pair of bosses 7a and 7b mounted at the center portion of a horizontal shaft 6 located between the gas inlet port 2 and gas exhaust port 3. The left and right sides of the drum 8 are formed as lattice structures incorporating orifices of from 90 mm to 100 mm in size in order to prevent the escape of the air-liquid contact filler pieces 9.

Moreover, as shown in FIG. 5, should the drum 8 be of large diameter, the interior region may be divided into multiple internal spaces through the inclusion of small and medium diameter cylindrical structures 8*a* and 8*b* whose centers are concentric on the horizontal shaft 6, and also divided by the use of radial partition walls 8*c* and 8*d*. This structure prevents the uneven distribution of the gas-liquid contact filler pieces 9 within the drum 8 and stabilizes their uniform disposition therein, thus increasing the efficiency of the desulfurization process.

The horizontal shaft 6 supports the drum 8 through bearings 5*a* and 5*b* which are respectively located at the gas inlet port 2 side and opposing gas exhaust port 3 side of the drum 8. Furthermore, as shown in FIG. 3, each gas-liquid contact filler piece 9 may comprise a lattice casing 9*a* which encloses one or more of a separate freely movable inner filler element 9*b*, thus forming a structure wherein the slurry flowing downward within the drum 8 more easily forms a film which propagates maximum gas-liquid contact between the passing gas and slurry within the drum 8.

As shown in FIG. 3, a lattice casing 9*a* is a hollow cylindrical structure, 110 mm in diameter and 90 mm long, which may be constructed from a synthetic resin or similar plastic material, and which incorporates at least 18 window-like openings 9*c* and 9*d* in the circumference and right and left ends respectively. The two inner filler elements 9*b*, which reside within the lattice casing 9*a*, are also of cylindrical shape and of sufficient size (i.e. 50 mm in diameter and 50 mm in length in the FIG. 3 embodiment) to prevent their escape from the lattice casing 9*a*. The lattice casing 9*a* and inner filler element 9*b* may be made from the plastic material noted above as well as metal or rubber.

Moreover, the gas-liquid contact filler pieces 9 within the drum 8 may also be structured as a Rashig ring, pall ring, or net ring, a monolith incorporating multiple air spaces, a metallic mesh, or a pillar-like structure of one or more plates incorporating multiple orifices.

The holding tank 10 is disposed at the lower portion of the fixed duct 1 beneath the drum 8, and incorporates an air injection pump 11, agitation unit 12, and gas shield plates 14*a* and 14*b*. A pipe 16 is connected to a valve 15 at the bottom of the holding tank 10 as means of allowing the controlled discharge of gypsum there from. The slurry stored within the holding tank 10 is a limestone slurry which is fed into the holding tank 10 through a slurry supply pipe 17.

A slurry circulation means 13 is used to carry the slurry within the holding tank 10 upward to the drum 8 and discharge it onto the upper circumference and sides thereof. Media pump "P" pumps the slurry held within the holding tank 10 upward through pipes 13*a* and 13*b* and discharges the slurry onto to the upper circumference and sides of the drum 8 at a point offset from the horizontal shaft 6 along the radial axis, thus supplying a greater weight volume of slurry to one side of the drum 8 than to the other.

The slurry is sprayed onto the upper part of the circumferential surface and onto a side of the drum 8, at a point offset from the horizontal shaft 6 along the radial axis, in order to apply a greater weight volume of slurry to one side of the drum 8. The amount, and therefore weight, of slurry sprayed into the drum, from a point offset from the horizontal shaft 6 along the radial axis, can be adjusted to control the extent of weight imbalance within the drum 8, and thus control rotational speed.

The above-noted structure provides for a continuous supply of particulate limestone slurry from the supply pipe 17 into the holding tank 10. The slurry within the holding tank 10 is enriched with oxygen through the air injected by the air injection pump 11 and the air purge executed by the agitation unit 12. The slurry is then pumped through pipes 13*a* and 13*b*, by the circulation pump 13, and sprayed onto the drum 8 in a diffused liquid state. In regard to the weight of the circulated slurry, a liquid-gas ratio of over 11 l/Nm$^3$ has been found to be adequate.

The diffused slurry need not be supplied only by a spray nozzle, but may simply be poured downward from the end of a supply pipe. In this case the drum 8, which contains the gas-liquid contact filler pieces 9 or other like filler substance, is a symmetrical structure which may be easily rotated around its central axis on the horizontal shaft 6 by the application of a small amount of torque. Therefore, the continuous circulation and application of a large volume of diffused liquid slurry onto the upper circumference and against a side of the drum 8, at a point offset from the horizontal shaft 6 along the radial axis, creates a weight imbalance within the drum 8 which has the effect of initiating rotation in the same manner as a water wheel is rotated by a flow of water.

Moreover, because the weight of the half of the drum 8 through which the slurry is flowing downward is greater than the weight of the other half, a weight imbalance is created within the drum 8, thus creating a torque-generation effect which acts to continue the rotation of the drum 8.

In regard to the rotational speed of the drum 8, a speed of three revolutions per minute is sufficient to provide adequate gas-liquid contact between the slurry in the drum 8 and the gas passing there through. Because gas-liquid contact becomes ineffective at a rotational speed below one revolution-per-minute, and because a rotational speed of over seven revolutions-per-minute provides no further effectiveness, the ideal speed of rotation of the drum 8 lies within a range of from one to seven revolutions-per-minute.

In regard to the mechanism which sets the required speed of rotation of the drum 8, the rotational speed may be controlled by adjusting the volume of slurry pumped upward by the pump "P" of the slurry circulation means 13, and may also be easily controlled by adjusting the volume of slurry striking a bucket and/or pressure plate installed to the perimeter of the drum 8 for either forward or reverse rotation. The target gas, which is propelled by a fan not shown in the drawings, enters the fixed duct 1 from the gas inlet port 2, passes through the drum 8 which is disposed in the center of the duct 1, and then passes through a mist separator 4 before exiting from the gas exhaust port 3.

The slurry circulating through the drum 8 flows downward over the surfaces-of the gas-liquid contact filler pieces 9 therein while eccentrically weighting the drum 8 in the rotating direction, and therefore forms a large surface area of slurry for the gas flowing through the fixed duct 1 to come into contact with as the gas and liquid react while the slurry flows downward into the holding tank 10. The slurry falling into the holding tank 10 contains a large amount of gypsum as a result of the gas-liquid contact. While in the holding tank 10, the slurry is purged of air by the operation of the air induction unit 11 while being mixed by the agitation unit 12, thus causing the limestone particles to dissolve through the addition of the fresh oxygen while the slurry is circulated.

The reaction taking place between the target gas and slurry may be expressed as:

$$SO_2 + \tfrac{1}{2}O_2 + CaCO_3 + 2H_2O \rightarrow CaSO_4 \cdot 2H_2O + CO_2$$

Control of this reaction is executed as follows:
1. The volume of limestone slurry supplied is controlled according to the extraction rate or PH of the slurry.
2. The surface level of the liquid in the holding tank is controlled by the volume of discharged gypsum slurry.

COMPARATIVE EXAMPLE

The following four groups of data were based on test runs of the limestone-gypsum desulfurization apparatus previously noted in Japanese Utility Model Patent No. 53-19171; one apparatus having a drum diameter of 1 meter, one having a drum diameter of 3.2 meters and two having a drum diameter of 4.5 meters.

| volume of gas to be treted ($Nm^3/h$) | 200,000 | 500,000 | 1,000,000 | 3,000,000 |
|---|---|---|---|---|
| size of drum         diameter (m) | 6.2 | 9.9 | 14.0 | 24.3 |
| (filler)             length (m) | 3 | 3 | 3 | 3 |
| rotating speed (rpm) | 5 | 5 | 5 | 5 |
| diameter and length of filler pieces (mm) | 110 × 110 | 110 × 110 | 110 × 110 | 110 × 110 |
| liquid-gas ratio ($1/Nm3/h$) | 11 | 11 | 11 | 11 |
| circulation pump volume ($m^3/h$) | 2,200 | 5,500 | 11.000 | 33,000 |
| gas flow pressure loss (mn $H_2O$) | less than 200 | less than 200 | less than 200 | less than 200 |
| sulfur extraction slurry | 13% | 13% | 13% | 13% |
| by product | limestone gypsum | limestone gypsum | limestone gypsum | limestone gypsum |
| $SO_2$ at gas inlet | 1,000 | 1,000 | 1,000 | 1,000 |
| sulfpur extraction rate | 95% | 95% | 95% | 95% |
| required pump head ($H_2Om$) | 10 | 15 | 20 | 30 |

Most limestone-gypsum type desulfurization devices in current use are the spray tower type which exhibits the drawbacks of a significant loss in gas flow pressure requiring the use of a high-pressure exhaust fan, and the necessity of using a high capacity pump to pump slurry up to the top of a tower. The invention described in this application, as shown in FIG. 3, makes use of a multiplicity of gas-liquid contact filler pieces within a drum which is rotationally driven by a flow of slurry which is pumped upward from a slurry holding tank, by a slurry recirculation means, and discharged onto the upper circumferential surface of the drum. The downward flow of slurry, which is applied to a side of the drum offset from the horizontal shaft along the radial axis, causes the drum to rotate, thus forming a mechanism which reduces the amount of energy consumed by the desulfurization device.

The magazine *Thermal and Nuclear Power* has published the following information pertaining to the Matsuura Thermal Power Station No. 2 Unit (operating by the Electric Power Development Co, Ltd.) and the Hitachinaka Power Station No. 1 Unit (operated by the Tokyo Electric Power Company Inc.). These are power generating facilities in the 3,000,000 $Nm^3/h$ class. The Matsuura Thermal Power Station No. 2 has 12 circulation pumps of 72.5 $m^3/min$ capacity, and a fan of 39,200 $m^3/min×560$ mmAg capacity which provide a total flow rate of 52,200 $m^3/h$. The Hitachinaka Power Station No. 1 unit has five circulation pumps of 127.5 $m^3/mn$ capacity which provide a total flow rate of 38,250 $m^3/h$.

Compared to the above-noted 3,000,000 $Nm^3/h$, the capacity of the pump is greater than that required by the design specification. That is, the structure described by the invention uses significantly less energy due to the use of the circulating slurry to rotate the drum 8. Comparing fan capacities, the invention requires only 200 mmAG which is less than 50% of the 560 mmAg required by the previously noted Matsuura Thermal Power Station No. 2 Unit. Therefore, the invention also reduces the amount of energy required by the fan.

As the previous description has noted, the invention is of simple mechanical structure, particularly in regard to the fan and slurry circulation pump 13, a factor which lowers equipment costs for users. The invention also offers an economical smoke desulfurization process which consumes significantly less electrical power, less than 0.5% of the output of the electrical generator, and thus significantly reduces the running costs of the power generating facility.

Moreover, the liquid-gas ratio may be reduced by increasing the density of the slurry, and the drum 8 may be operated at a speed down to one revolution per minute and still reduce scaling. Furthermore, in regard to maintaining the effectiveness of the liquid-gas reaction, the rotational speed may be increased to reduce the liquid-gas ratio while absorption efficiency is increased.

Figure 1:
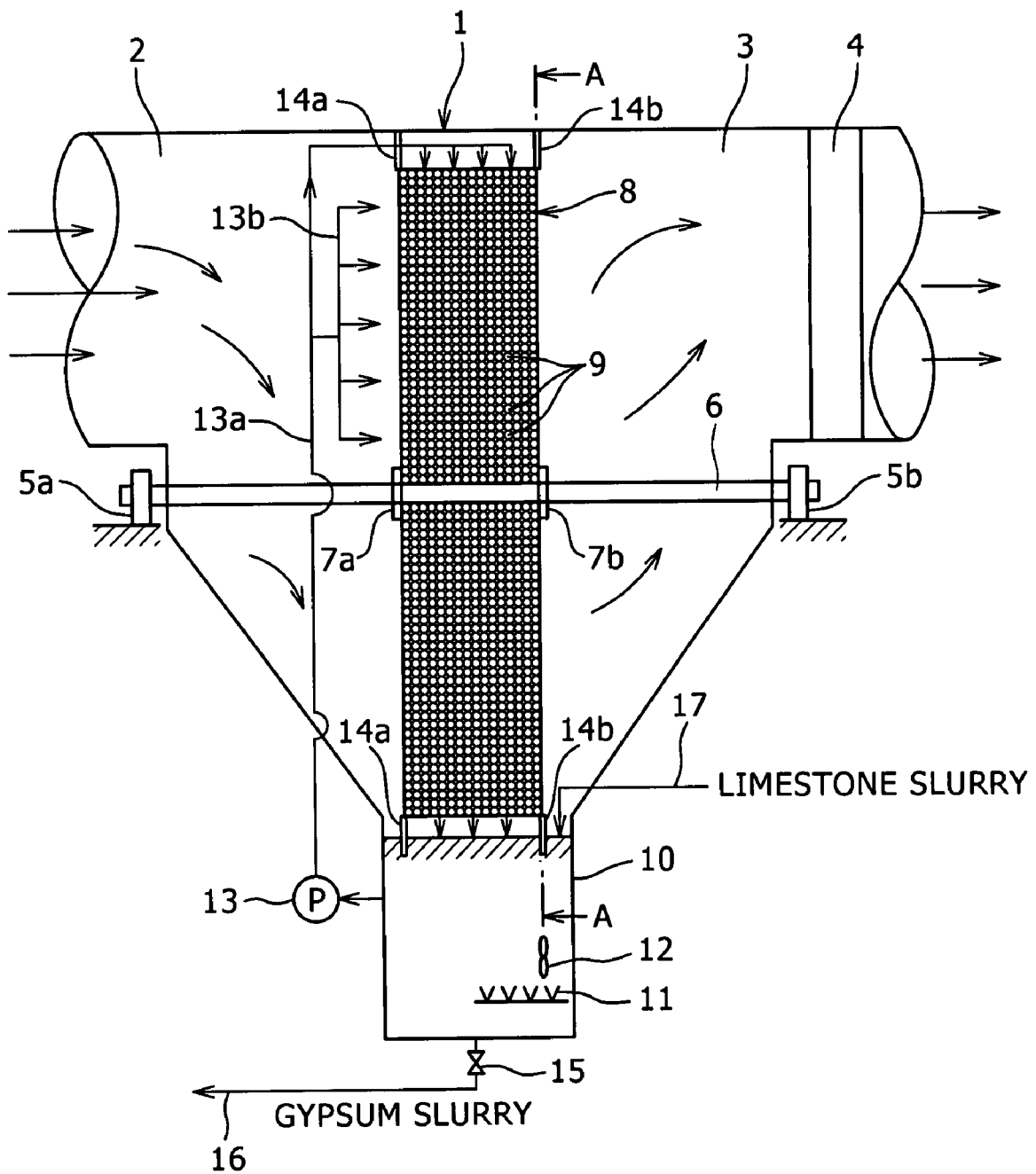
FIG. 1 is a cross sectional line drawing describing an embodiment of the polluting gas desulfurization device specified by the invention.
Figure 2:
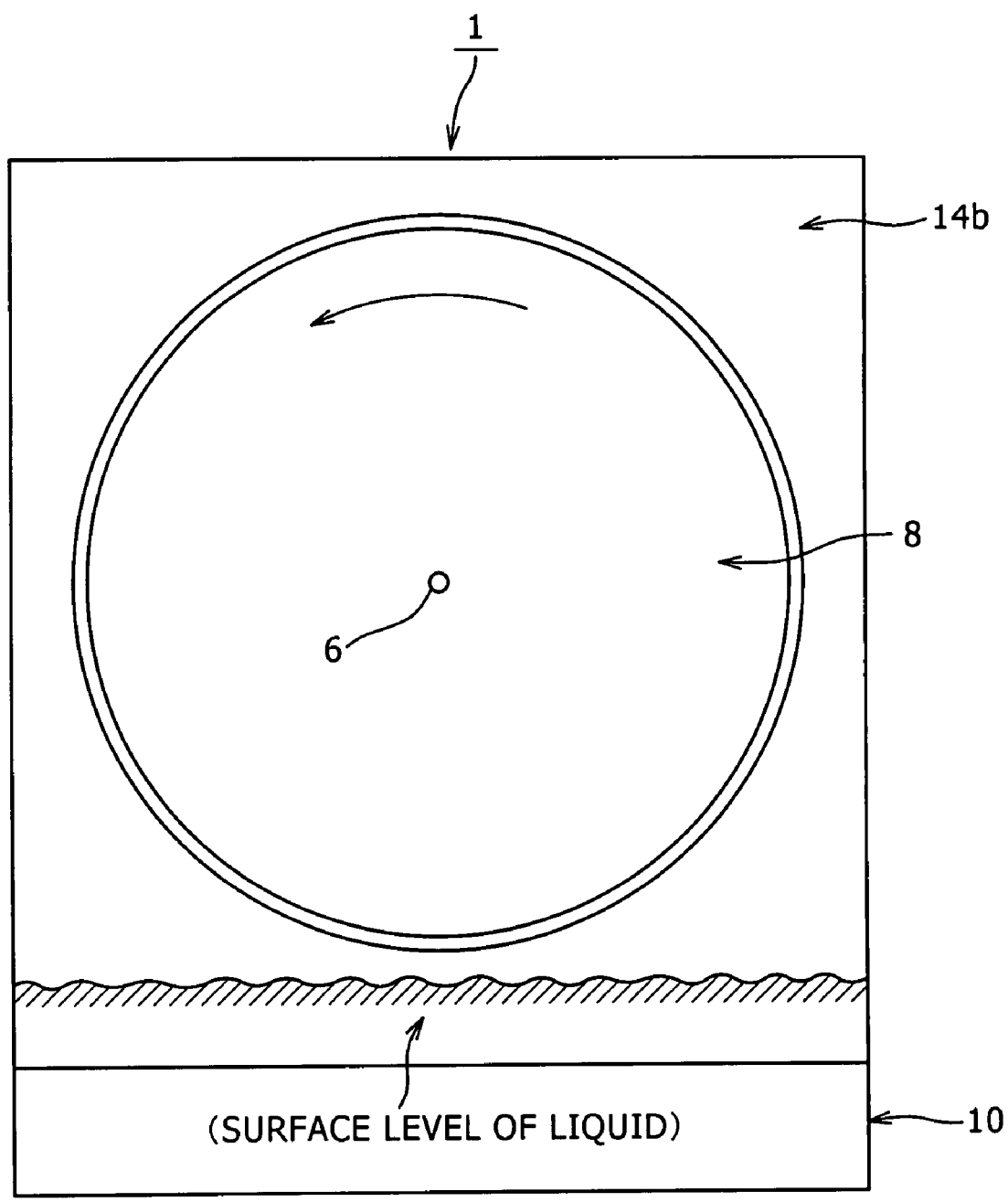
FIG. 2 is a cross section of the FIG. 1 drawing taken through plane A-A.
Figure 3A:
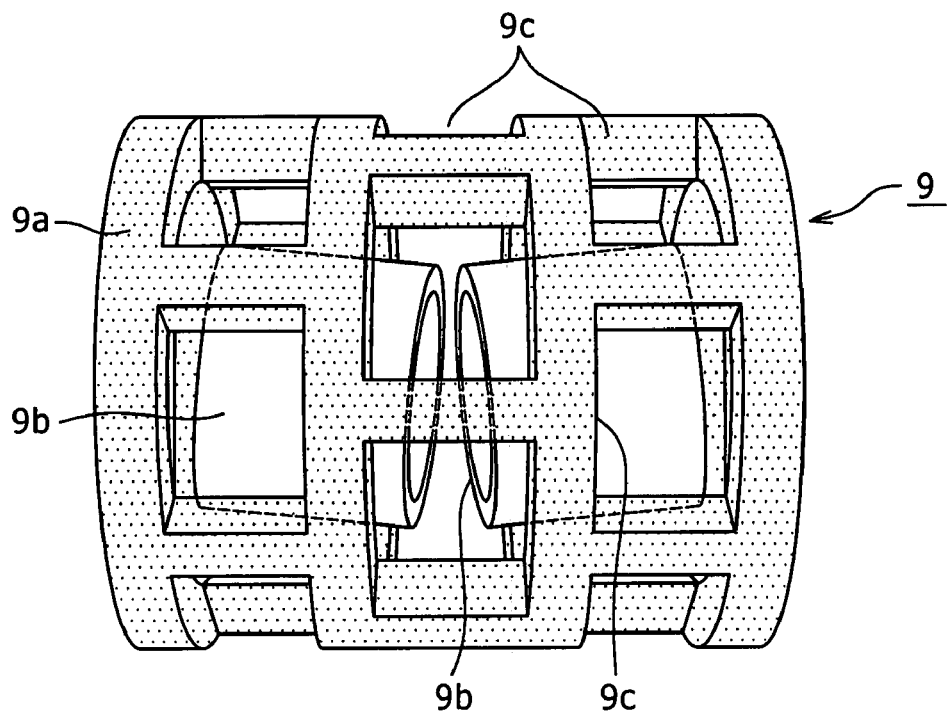
FIGS. 3A and 3B are enlarged frontal and side views of the liquid-gas contact filler piece specified by the invention.
Figure 3B:
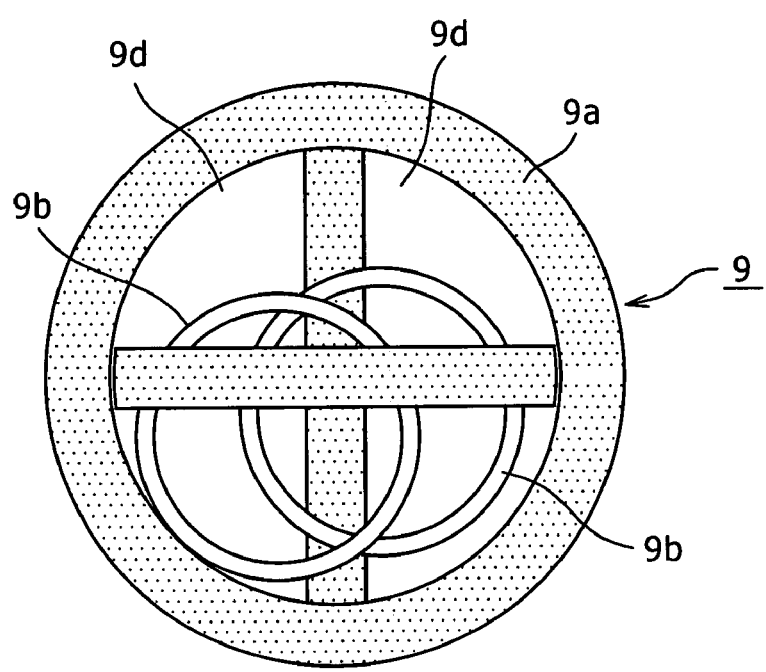
Figure 4:
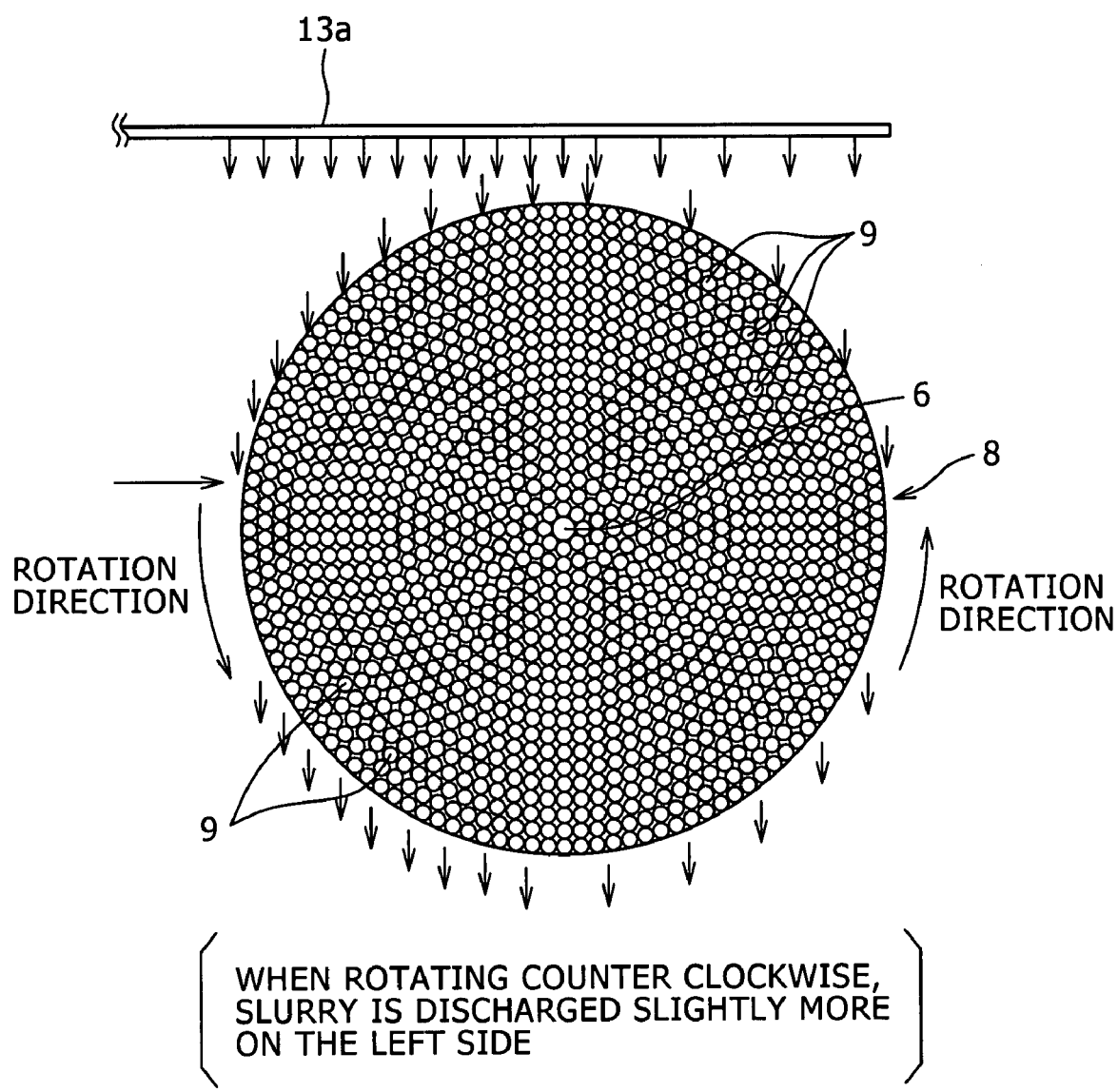
FIG. 4 is a cross sectional view of the drum showing slurry being applied by the slurry recirculation means.
Figure 5:
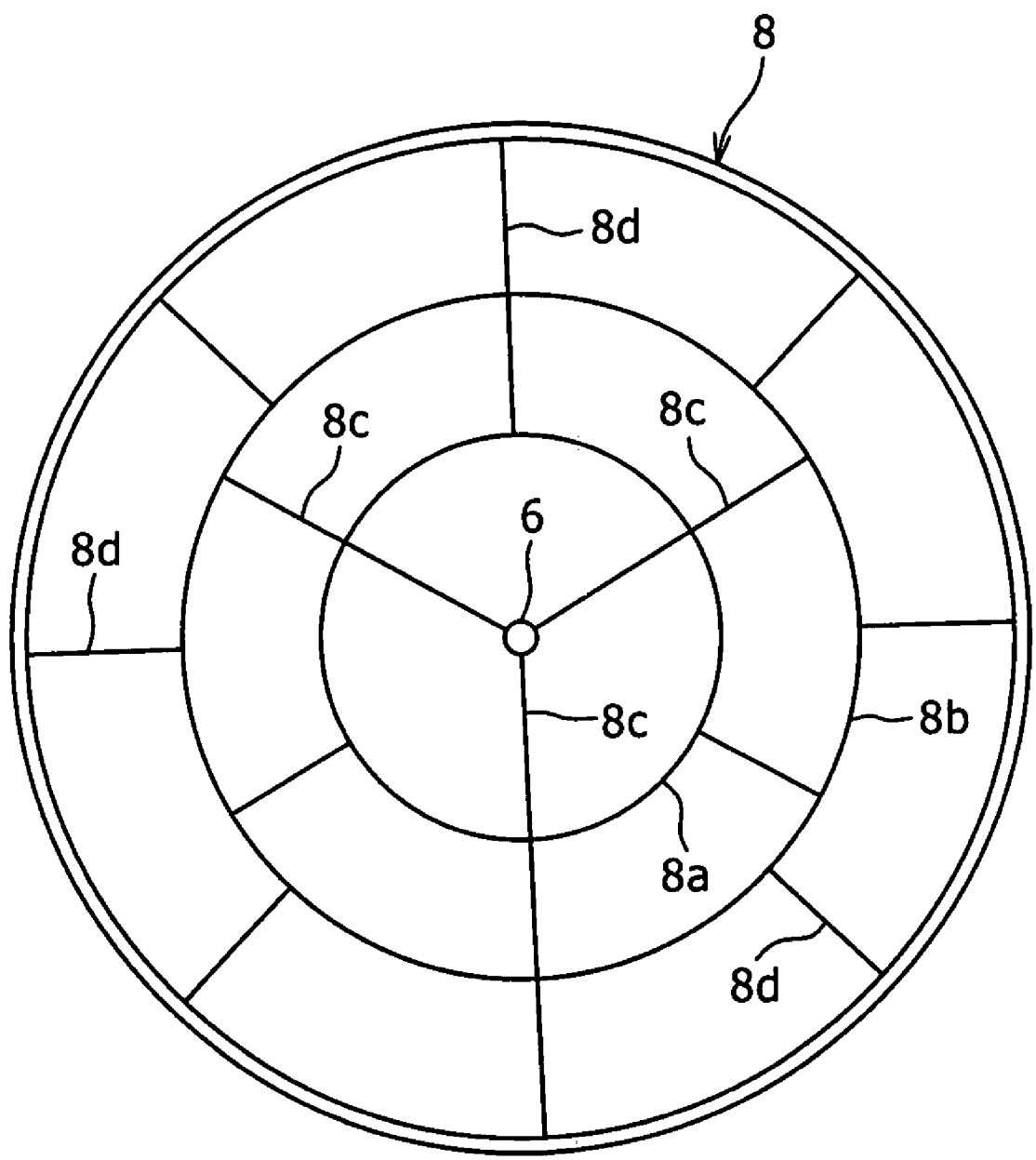
FIG. 5 is a cross sectional view of an additional embodiment of the drum used by the invention.

| [Key to Illustration Elements] | |
|---|---|
| 1 | fixed duct |
| 2 | gas inlet |
| 3 | gas outlet |
| 4 | mist separator |
| 5a | bearing |
| 5b | bearing |
| 6 | horizontal shaft |
| 7a | boss |
| 7b | boss |
| 8 | drum (basket shaped) |
| 9 | gas-liquid contact filler |
| 9a | lattice casing |
| 9b | inner filler element |
| 10 | slurry holding tank |
| 11 | air injection pump |
| 12 | agitation unit |
| 13 | slurry circulation pump |

-continued

[Key to Illustration Elements]

| | | |
|---|---|---|
| 13a | pipe | |
| 13b | pipe | |
| 14a | gas shield plate | |
| 14b | gas shield plate | |
| 15 | valve | |
| 16 | pipe | |
| 17 | limestone slurry supply pipe | |

The invention claimed is:

1. An exhaust smoke desulfurization apparatus comprising a rotatable drum having lateral and circumferential surfaces of a perforated lattice structure rotatably supported at its axial center, within a fixed duct of specific length, by a horizontal shaft extending from a gas inlet port side to a gas exhaust port side of said fixed duct;

a rotatable filler thickness formed of gas-liquid contact filler pieces residing within the aforesaid drum;

a slurry holding tank incorporating a gas sealing plate installed at the gas inlet and gas outlet side of the rotatable filler thickness as means of axially directing a flow of gas through the filler thickness, a supply pipe which supplies a slurry containing an absorption agent, and a discharge pipe which exhausts a product material within the slurry, said supply pipe and discharge pipe being installed beneath the filler thickness, and a recirculation means incorporating a pump which pumps the slurry upward from the slurry holding tank onto the upper part of the circumferential surface of the drum, at a point offset from the horizontal shaft along the radial axis, in order to apply a greater weight volume of slurry to one side of the drum, thus inducing a weight imbalance of slurry within the drum which has the effect of rotating the filler thickness and further propagating gas-liquid contact.

* * * * *